US007766224B2

(12) United States Patent  (10) Patent No.: US 7,766,224 B2
Vogt  (45) Date of Patent: Aug. 3, 2010

(54) MONEY TRANSFER WALL UNIT

(75) Inventor: Paul J. Vogt, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 1086 days.

(21) Appl. No.: 11/089,052

(22) Filed: Mar. 23, 2005

(65) Prior Publication Data

US 2006/0218063 A1    Sep. 28, 2006

(51) Int. Cl.
*G06K 5/00*    (2006.01)
*G07D 11/00*    (2006.01)
(52) U.S. Cl. ..................... 235/380; 235/379
(58) Field of Classification Search ................. 235/379, 235/380; 186/37
See application file for complete search history.

(56) References Cited

U.S. PATENT DOCUMENTS

| | | | | | |
|---|---|---|---|---|---|
| 3,943,335 | A | * | 3/1976 | Kinker et al. | 235/379 |
| 4,588,211 | A | * | 5/1986 | Greene | 283/70 |
| 4,689,478 | A | * | 8/1987 | Hale et al. | 235/380 |
| 4,735,289 | A | * | 4/1988 | Kenyon | 186/37 |
| 4,885,459 | A | * | 12/1989 | Norsworthy | 235/495 |
| 5,025,139 | A | * | 6/1991 | Halliburton, Jr. | 235/379 |
| 5,220,501 | A | * | 6/1993 | Lawlor et al. | 705/40 |
| 5,632,458 | A | * | 5/1997 | Tollerud | 248/121 |
| 5,870,724 | A | * | 2/1999 | Lawlor et al. | 705/42 |
| 5,887,243 | A | * | 3/1999 | Harvey et al. | 725/136 |
| 6,012,635 | A | * | 1/2000 | Shimada et al. | 235/380 |
| 6,223,983 | B1 | * | 5/2001 | Kjonaas et al. | 235/379 |
| 6,669,088 | B2 | * | 12/2003 | Veeneman | 235/383 |
| 6,688,518 | B1 | * | 2/2004 | Valencia et al. | 235/379 |
| 7,624,919 | B2 | * | 12/2009 | Meek et al. | 235/379 |
| 2002/0084322 | A1 | * | 7/2002 | Baric | 235/381 |
| 2003/0126083 | A1 | * | 7/2003 | Seifert et al. | 705/43 |
| 2004/0222286 | A1 | * | 11/2004 | Douglass et al. | 235/381 |
| 2005/0056698 | A1 | * | 3/2005 | Cummings et al. | 235/386 |
| 2006/0218063 | A1 | * | 9/2006 | Vogt | 705/35 |

* cited by examiner

*Primary Examiner*—Thien M Le
(74) *Attorney, Agent, or Firm*—Townsend and Townsend and Crew LLP

(57) ABSTRACT

A financial transaction wall unit workstation is provided which may be configured to attach to a vertical support and may comprise include at least one display face, a transaction interface for communicating between the financial transaction wall unit workstation and a financial services provider, and a consumer display with instructions for using the financial transaction wall unit workstation to transact a financial transaction with the financial services provider. In certain aspects, the financial transaction wall unit workstation may be attached to a vertical support using a flexible attachment mechanism. Attachment of the financial transaction wall unit workstation to a vertical support using flexible attachment mechanisms may provide for vertical movement of the financial transaction wall unit workstation and may allow for accessibility of the financial transaction wall unit workstation by people of different statures and people in wheel chairs.

41 Claims, 4 Drawing Sheets

MONEY TRANSFER WALL UNIT

BACKGROUND OF THE INVENTION

The present invention relates generally to work stations from which financial transactions may be conducted, and more specifically, but not by way of limitation, to wall mounted and/or vertically moveable work stations from which consumers may make money transfers.

Financial transactions may be conducted in many different types of settings. By way of example, financial transactions may be performed over the counter at a financial institution, over the counter at an agency acting as an agent for a financial services provider, or at a remote kiosk such as an automated teller machine ("ATM"). However, such financial transaction interfaces may have various design limitations. For example, bank service counters often are at a height to accommodate an average sized standing adult, but may not easily accommodate shorter individuals, children, or individuals in a seated position, such as in a wheelchair. Similarly, access to ATMs and other financial services kiosks may not provide complete access to shorter people or people in wheelchairs because of the inflexibility of the kiosk design.

With regard to transaction terminals, ATMs and financial transaction kiosks may require large amounts of floor space due to the kiosks footprint and this may make the locating of such kiosks problematic, especially in small areas and may make the kiosk less desirable to merchants. Further, instructions for making financial transactions, an interface for making a financial transaction, information related to the financial transactions, means for recording financial transaction particulars, and the like, are in general not incorporated into a single terminal. Poor accessibility and the diffusion of financial transaction interfaces and financial transaction instructions may make the underlying financial transaction less desirable to a consumer.

Moreover, the accessibility to consumers of financial transaction functionalities is not just a matter of convenience. The American Disabilities Act (ADA) was enacted to provide more routine access for handicapped users to a wide range of public and private structures. The ADA has greatly increased public access for handicapped individuals, and has wide ranging emotional and psychological benefits as well. Under the ADA, many retail establishments and the like are mandated to provide accessibility to people of all physical characteristics.

BRIEF SUMMARY OF THE INVENTION

The present invention relates generally to work stations from which financial transactions may be conducted, and more specifically, but not by way of limitation, to wall mounted and/or vertically moveable work stations from which consumers may make money transfers.

In one embodiment of the present invention, an exemplary wall unit transaction workstation may include a transaction interface and a consumer display. The transaction interface may be adapted to provide for communication between the wall unit transaction workstation and a financial services provider. In particular embodiments, the consumer display may provide an instruction set comprising instructions for performing a financial transaction. In certain embodiments, a wall unit transaction workstation may comprise flexible attachments that provide for attaching the workstation to a support so that the workstation may be moved vertically to provide for access to the workstation by people of different statures and people confined to wheelchairs.

BRIEF DESCRIPTION OF THE DRAWINGS

The present disclosure is described in conjunction with the appended figures.

Figure 1A:
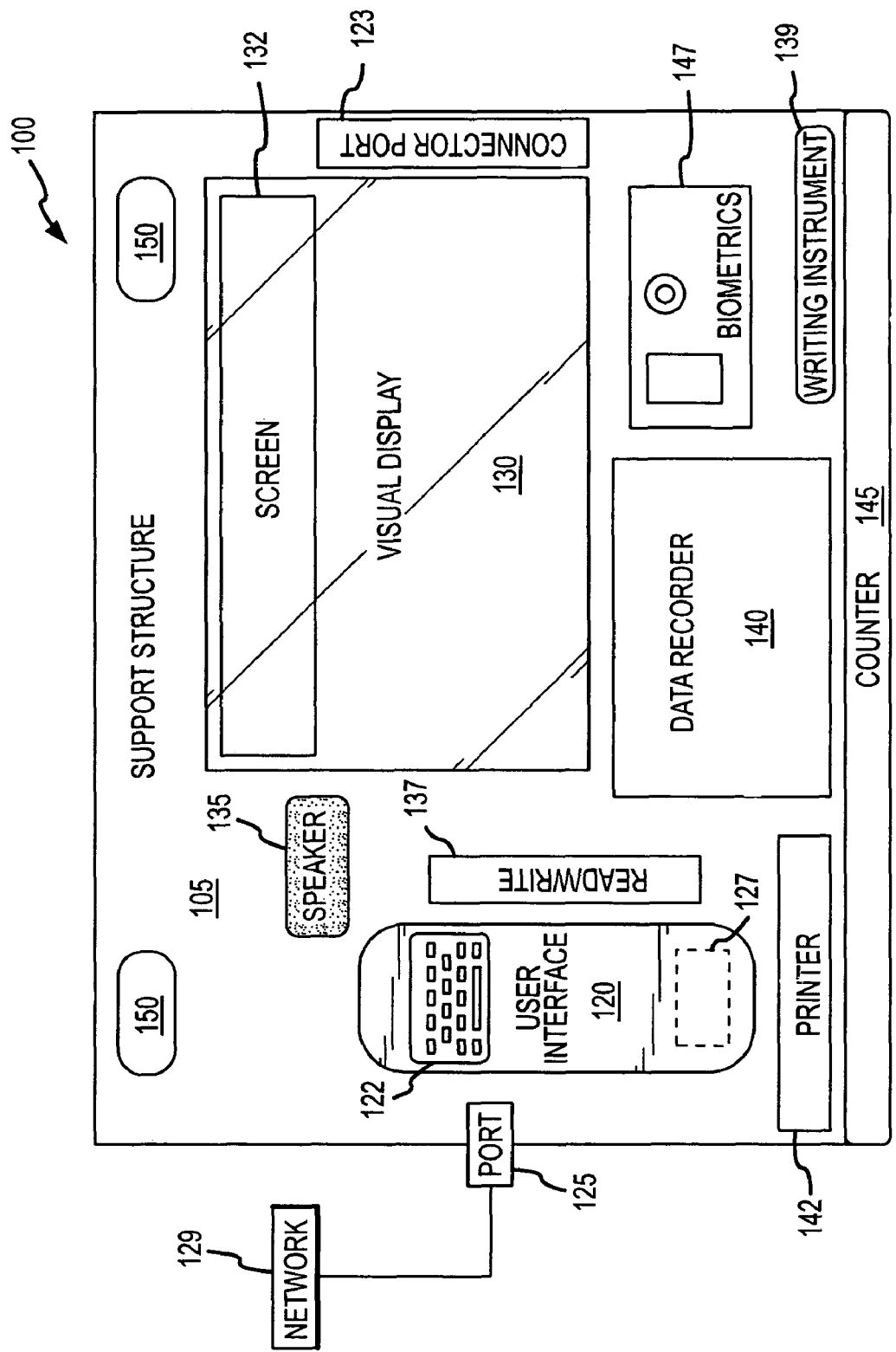
FIG. 1A is a front view of a money transfer wall unit according to an embodiment of the present invention.

In the appended figures, similar components and/or features may have the same reference label.

DETAILED DESCRIPTION OF THE INVENTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

In this disclosure, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

In the following description, a financial transaction wall unit is disclosed for use by a consumer for making money transfers. However, the financial transaction wall unit need not be limited in use to money transfers and may be used for other financial transactions and/or financial services, wherein the terms "financial transactions" and "financial services" may include any transaction and/or services that may be provided to a consumer for a direct/indirect fee. For example, the financial transaction wall unit may be used for banking transactions, loan requests, bill payment, establishing wireless phone service, adding minutes to wireless phone plan, including a pay as you go plan, downloading ringtones and/or music to a portable device, entering a sweepstakes, and the like. Correspondingly, the terms "financial services provider" and "transaction provider" may describe any person or entity that may provide "financial transactions" and/or "financial services," including the transactions and/or services described above.

Money transfers may involve the transfer of data to effect a money transfer transaction with a financial services institution. Money transfers may include send transactions and receive transactions. In a send transaction, a sender may electronically send or "wire" money to a recipient through the financial services institution. In a receive transaction, the recipient may send data to a financial institution and receive money. The money may be received directly from the financial institution, but more commonly is received from an agent of the financial institution that may receive a commission for the transaction. An agent may be a dedicated agent who promotes and provides services for the financial institution, a retail concern with a contract with the financial institution to provide cash transfer services, or the like.

A send transaction may involve a sender completing a transaction form and providing the form to an agent. The transaction form may include such information as the desired amount of money to be sent, sender information, and recipient information. The agent may then enter the information from the transaction form into a computer that is in communication with a central database of the financial services institution. Alternatively, the agent may read the information to a representative of the financial services institution, and the representative may provide additional information to the agent that is added to the transaction form. Next, the agent collects from the sender the desired amount of money to be sent plus any applicable fees and/or taxes.

Figure 1B:
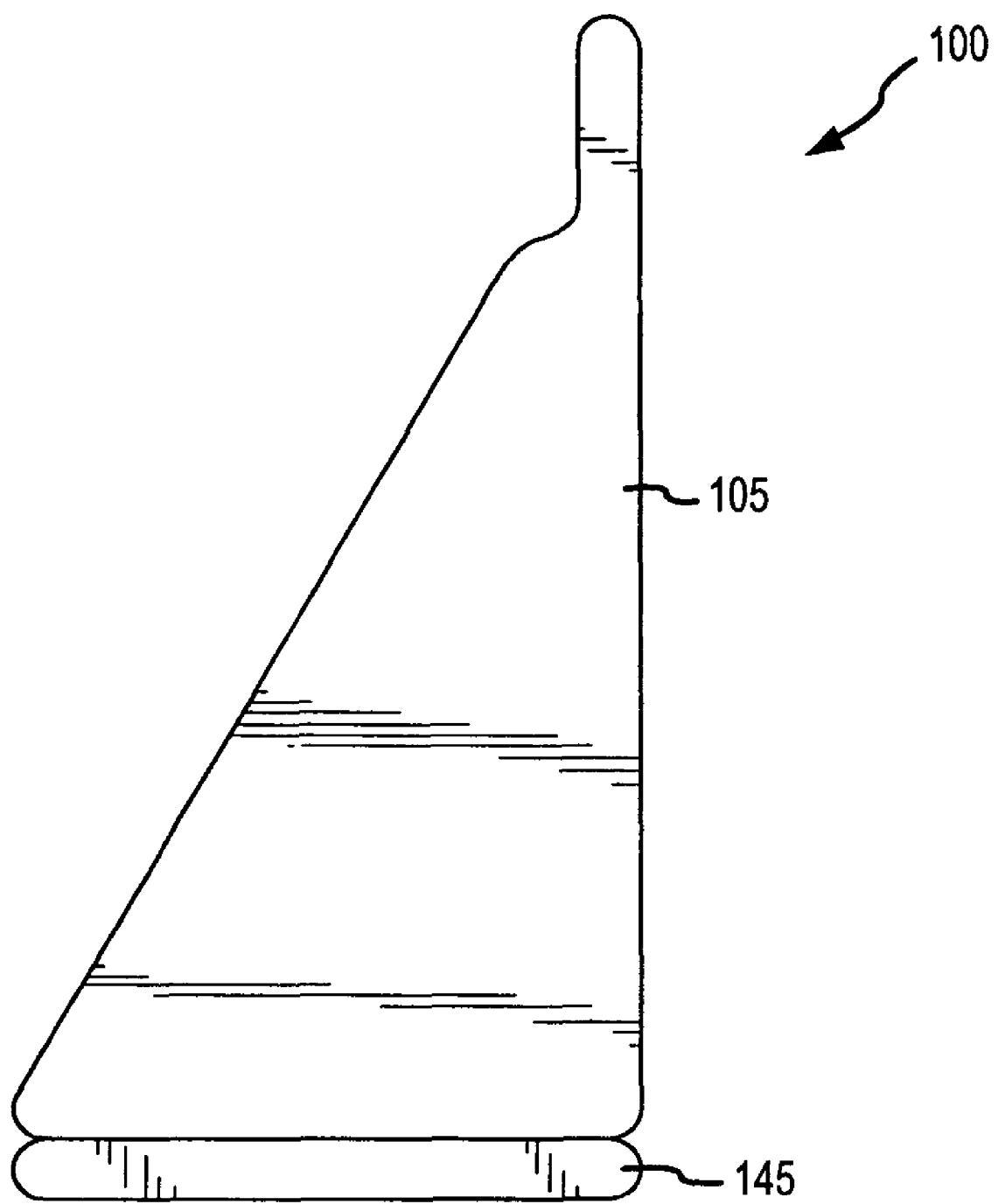
FIG. 1B is a right side view of the money transfer wall unit of FIG. 1A.

FIGS. 1A and 1B depict a money transfer wall unit according to an embodiment of the present invention. FIG. 1A is a front view of a money transfer wall unit according to certain embodiments of the present invention. FIG. 1B is a right side view of the money transfer wall unit of FIG. 1A. In some embodiments of the present invention, the money transfer wall unit 100 may be modular in design and may include all of or any combination of the features illustrated in the figures and/or described below. The modular design of embodiments of the present invention may allow for a manufacturer, a financial services provider and/or an agent, such as an agent providing money transfer services provided by a financial services provider to the agent's customers, to customize the features of the money transfer wall unit 100. In aspects of the present invention, customization of the modular features may be performed for cost, convenience and/or other reasons.

Transaction booth 100 preferably is adapted for facilitating financial transactions, including transactions disclosed in U.S. Pat. No. 6,488,203, issued Dec. 3, 2002, assigned to the assignee of the present invention, the complete disclosure of which is incorporated herein by reference for all purposes. For example, the money transfer wall unit 100 may be used to prepare or complete the appropriate financial forms for the transfer of funds from one location to another.

The money transfer wall unit 100 may include a support structure 105 that may be used to house the different components that may make up the money transfer wall unit 100 according to different embodiments of the present invention. In the embodiment of the present invention depicted in FIG. 1B, the support structure 105 may be wider at the bottom than at the top of the money transfer wall unit 100, when looked upon from the side view depicted in FIG. 1B, to provide that the components housed in the money transfer wall unit 100 may be inclined towards a consumer using the money transfer wall unit 100. The inclination of the components of the money transfer wall unit 100 towards the consumer may make the money transfer wall unit 100 more ergonomically accessible to the consumer. Support structure 105 may comprise a wide range of materials, including various metals such as aluminum, wood, plastic and the like. Further, support structure 105 may have different physical configurations than those shown in FIGS. 1A and 1B. For example, support structure 105 may be shaped differently to provide for different presentations of the components of the money transfer wall unit 100 to consumers.

In certain aspects, the support structure 105 may include a display area into which components of the money transfer wall unit may be integrated. Components of the money transfer wall unit 100 may be incorporated into the display area to provide for maximum visibility and/or accessibility to consumers. However, components of the money transfer wall unit 100 may also be incorporated into the sides, top and bottom of the money transfer wall unit 100. Components may be incorporated into the sides of the money transfer wall unit 100 for ergonomic reasons, space requirements, and/or the like. Moreover, components for attaching the money transfer wall unit 100 to a support may be attached to the backside of the money transfer wall unit 100.

In a particular embodiment, the money transfer wall unit 100 may include one or more user interfaces to facilitate the money transfer. The user interface may be embodied in a number of different mechanisms, including without limitation, a telephone, a processor, a keyboard, a touch-screen, or the like. In an embodiment of the present invention, the money transfer wall unit 100 may include a user interface 120. The user interface 120 may be used by a consumer to interface with a financial services provider. Interfacing may provide for accessing the financial services institution to provide transaction details to the financial services provider, which may include an identification of the location of the money transfer wall unit, obtaining transaction instructions from the financial services provider and/or receiving data to complete a money transfer transaction with the financial services provider. Because of the size of the money transfer wall unit and the ability of the money transfer wall unit 100 to be flexibly attached to a supporting structure such as a wall, as discussed in more detail below, the money transfer wall unit 100 may be easily installed in almost any location. This flexibility of installation and lack of a large footprint may provide for the money transfer wall unit 100 being located in multiple locations giving consumers extensive access through the money transfer wall unit 100 to the financial services provider.

The user interface 120 may comprise a telephone. In such an embodiment, the telephone may be configured to provide direct access to the financial services provider through a customer services representative (CSR) or the like. In certain aspects, a connection to the CSR may occur automatically when the handset of the telephone is picked up. The CSR may communicate to the consumer via the telephone various instructions for initiating or completing financial transactions, including without limitation, an instruction set for filling out financial transaction forms. The telephone may have an ADA compliant volume control feature to allow a user to increase or decrease the telephone receiver volume.

In another embodiment, the user interface 120 may include a processor 127. In such an embodiment, the processor 127 may be capable of communicating with the CSR. In certain aspects, the user interface 120 may include a keyboard 122. Keyboard 122 may be associated with the processor 127. In certain aspects, a consumer may enter data concerning a money transfer into the keyboard 122 and the processor 127 may then send the entered data to the CSR. In embodiments where the consumer communicates with the CSR, the CSR may have access to a central database or host computer of the financial services institution, and the CSR may enter information into and receive information from the host computer. In certain aspects, the CSR may have access to a secondary database that is in communication with the host computer. Alternatively, the processor may be connected to a database at the financial institution and the consumer may use the processor to interface with the host computer, the central database and/or the secondary database. In certain embodiments, the user interface may be a combination of phone and processor so that the consumer may talk to the CSR through the phone and communicate data to the CSR, the host computer, the central database and/or the secondary database using the keyboard.

In certain embodiments, the money transfer wall unit 100 may include a network connector 125 to connect the money transfer wall unit 100 to a computer network 129. In certain aspects, the computer network 129 may be the Internet. In other aspects, the connector 125 may be a modem, a WiFi connector, a WiMAX connector, and/or the like. In some embodiments, the money transfer wall unit 100 may include one or more processors, which may include processor 127, and these processors may connect money transfer wall unit 100 with a CSR through connector 125 and via the computer network 129.

The money transfer wall unit may also include a visual display 130. The visual display 130 may include language identifying the financial services provider and the services available through the money transfer wall unit 100 in large letters so that consumers can easily understand the functionality of the money transfer wall unit 100. The visual display 130 may include a list of instructions explaining how a money transfer may be made via the money transfer wall unit 100. For multilingual use, the instructions on the visual display 130 may be in multiple languages. For blind consumers, the instructions on the visual display 130 may be provided in brail.

The instructions may simply inform the consumer how to contact a financial services provider using the money transfer wall unit 100. The instructions may also explain how a money transfer may be arranged with the financial services provider using the money transfer wall unit 100. The instructions may provide a list of the services available to a consumer using the money transfer wall unit 100. Merely by way of example, the consumer may use the money transfer wall unit 100 to: (a) obtain and/or remotely send a gift card; (b) apply for a loan; (c) apply for a credit card; (d) pay a bill; (e) pay a bill using a swift pay transaction; (f) establish wireless phone service; (g) add minutes for use by a wireless phone and/or associated wireless phone plan; (h) add additional text and/or instant messaging for use by a portable device; (i) add additional email messaging for use by a portable device; 0) establish or make a payment on a computer network access service, such as, but not limited to service from an Internet Service Provider, DSL service, or the like; (k) enter a sweepstakes; and (l) upload/download services and/or information to and/or from a portable device, such as, but not by way of limitation, downloading ringtones and/or music to a personal digital assistant ("PDA") and/or wireless phone, downloading directions, maps, or the like, to a PDA. In certain aspects the money transfer wall unit 100 may include a connector port 123 for interfacing the money transfer wall unit 100 with a portable device. Merely by way of example, the connector port may be a USB port, a WiFi transmitter, infrared port, or the like, and the portable device may be a wireless phone, PDA, laptop computer, or the like. In certain aspects, the consumer may use the connector port 123 to download services from the money transfer wall unit 100 to the portable device. Merely by way of example, the consumer may download ringtones, music, video games, and/or the like using the connector port 123.

The instructions displayed on the money transfer wall unit 100 may include a list of the services available to a consumer using the money transfer wall unit 100 and a corresponding shortcut to access the listed services. Merely by way of example, services available using the money transfer wall unit 100 may be listed alphabetically and beside each service may be one or more numbers. In such an example, the consumer may enter the numerals corresponding to a desired service into the user interface 120 to access the desired service. For example, where the user interface 120 is a phone and a service, such as a money transfer corresponds to the number 3, the consumer may pick up the phone and dial the number 3 to access a money transfer transaction. In certain aspects where the user interface 120 is a processor, keyboard, touch-screen, and/or the like, the consumer may enter the number 3 into the processor and/or keyboard, or touch the number 3 on the touch-screen to access the money transfer transaction. In certain aspects, a money transfer transaction may require communication between the consumer and the financial services provider followed by payment of money to an agent of the financial services provider associated with the money transfer wall unit 100 to effectuate the money transfer.

The visual display 130 may also contain a location identifier. The location identifier may be a serial number or the like. In certain aspects, a user of the money transfer wall unit 100 may provide the location identifier to the financial services provider via the user interface 120. In this way, the consumer may receive a discount for the requested financial services and/or the financial services provider may track the location identifier to determine the usage of the money transfer wall units in the field. In one embodiment, a sheet of written instructions may be disposed on the visual display 130 or under a cover overlying at least a portion of the visual display 130. This may occur, for example, by having a laminated or other page containing instructions for the operation of the user interface 120.

In an embodiment of the present invention, the visual display 125 may include a display screen 132. The display screen may be a liquid crystal screen or the like. In certain embodiments, the display screen may be attached to the processor 127 associated with the user interface 120 and/or to a different processor associated with the money transfer wall unit 100. The display screen 132 may provide instructions to the consumer regarding operation of the money transfer wall unit 100. In an embodiment, display screen 132 may be coupled to a computer memory containing instructions for use of the money transfer wall unit 100 for a plurality of financial transactions. As persons of skill in the art will appreciate, the display screen 132 may provide for the display of a plurality of detailed instructions to the consumer by allowing the consumer to toggle instructions across the display screen 132. A processor or storage medium associated with the display screen 127 may allow for the instructions to be provided in different languages to consumers, wherein the consumers may be able to select between languages provided on the display screen 127.

In an embodiment of the present invention, the display screen 127 may be able to communicate with the user interface 120. In embodiments where the user interface 120 is associated with the processor 127, the display screen 127 may provide prompts to the consumer to enter information into the keypad 122 and may display responses and/or other information from the CSR, host computer, main database and or secondary database in response to data input into the processor 127 by the consumer. In an embodiment of the present invention, the display screen 127 may be a touch-screen and provide the consumer with an interface to provide information to the financial services provider. In certain aspects, the display screen 127 may display advertisements. Advertisements on the display screen 127 may be general in nature or when a consumer is processing a money transfer through the money transfer wall unit 100 the advertisements may be coordinated to the consumer based upon a stored profile for the consumer and/or the type of transaction the consumer is processing.

A speaker 135 may be provided on the money transfer wall unit 100 to provide for audible delivery of instructions concerning the operation of the money transfer wall unit 100. Speaker 135 may be adapted to provide audible instructions to a user. This may occur in several ways within the scope of the present invention. In one embodiment, speaker 135 may provide a speakerphone function for the user interface 120. In this manner, the user, once connected to the customer service agent via the user interface 120, can use both hands to hold or fill out various forms while the customer service agent interacts audibly with the user through speaker 135. In one aspect, speaker 135 may include a microphone capability.

In another embodiment, speaker 135 may be coupled to a computer memory, and the user may receive instructions for filling out various financial forms from the user memory. Such an embodiment may be operable without the use of user interface 120. Further, the user may use user interface 120 to contact the CSR with any questions not otherwise answered in the instruction set saved in memory. Speaker 135 may be useful, for example, for vision impaired customers. Speaker 135 in one embodiment includes a volume control, and will thus be helpful for users with limited or diminished hearing ability.

In an embodiment of the present invention, the money transfer wall unit 100 may include a read/write interface 137. In certain aspects, the consumer may swipe a computer-readable medium, such as a card containing machine accessible information that may be a magnetic stripe or the like, through the read/write interface 137 to enter information into the money transfer wall unit 100. The card may be preloaded with the data necessary for the money transfer. Thus, the consumer may contact the CSR using the user interface 120 and then swipe the card to provide information to the CSR. Alternatively, the customer may swipe the card to send money transfer data to the financial services host computer, the central database or the secondary database.

The computer/machine accessible information on the card or other computer/machine readable medium may identify a payee, a payor, the amount of the money transfer, banking information, a transfer amount, and/or the like. Information contained on the card or other computer-readable medium may also identify the consumer as a preferred customer and allow for the consumer to receive certain benefits from the financial services provider. The card or other computer-readable medium may also act as a loyalty card allowing the financial services provider to track customer transactions and determine usage by the financial provider's customer and it may use this data to target incentives, marketing materials, etc. In other aspects, the use of the card or other computer-readable medium may provide the financial service with information regarding repeated activity and/or large monetary value activity by the same person or group of persons that may be used to identify suspicious activity. The card or other computer-readable medium may also be a payment instrument so that the consumer may use the card or other computer-readable medium with the read/write interface 137 to perform a money transfer without having to provide any source of monetary funds to an agent associated with the finds transfer wall unit 100.

In some embodiments of the present invention, the read/write interface 137 may be a barcode reader, a Magnetic Ink Character Recognition ("MICR") device, a radio frequency ("RF") proximity reader, and/or the like. As with a card swipe, the consumer may use a card or the like containing a barcode, an MICR line or a smart device that can be read by a RF proximity reader to provide stored data to the money transfer wall unit 100. In certain aspects, the money transfer wall unit 100 may be equipped with a RF reader and be configured to transact with a smart card containing a RF chip. In certain aspects, the financial services provider and/or the agent associated with the money transfer wall unit 100 may dispense coupons or other incentives to existing and/or potential customers for money transfers containing barcodes and/or other machine accessible information that the consumers may enter into the money transfer wall unit 100 via the read/write interface 137. In other aspects, a merchant or service provider may provide its customers with media containing machine readable data to provide that its customers may easily make payments to the merchant or service provider using the money transfer wall unit 100.

As persons of skill in the art will appreciate, the use of a card or a similar data storage medium containing machine accessible information may streamline the money transfer process. Further, the read/write interface 137 may be used to write information to the card or other medium capable of receiving machine accessible code, etc. Information written to the card may include details of the money transfer transaction, such as a receipt and/or instructions for the agent associated with the money transfer wall unit 100. In this way, the consumer may provide the card or other medium written to by the read/write interface 137 and the agent associated with the money transfer wall unit 100 may access information on the card to finalize a money transfer transaction.

The money transfer wall unit 100 may include a data recorder 140. In an embodiment of the present invention, the recorder 140 may be a pad of writing material on which the consumer may record data provided to the consumer by the CSR, the host computer, the central database and/or the secondary database. Data may include a transaction number that the consumer may have to provide to an agent of the financial services provider at the location of the money transfer wall unit 100 along with monetary funds in order to effectuate the money transfer. The transaction number, in some aspects, may act as a receipt that the consumer may keep to establish that a money transfer transaction was performed via the money transfer wall unit 100.

In certain embodiments, the data recorder 140 may include a plurality of financial transaction forms. These forms may include a plurality of different forms for use with a variety of financial transactions that may include a variety of money transfer transactions. Alternatively, the forms may consist of a stack of a same form for use with a particular financial transaction. The transaction forms may include instructions for transacting a financial transaction using the money transfer wall unit 100. The transaction forms may also include spaces to be filled in by the consumer when interfacing with the financial services provider.

In one embodiment, the money transfer wall unit 100 may include one or more writing utensils, such as a pen, a pencil, or the like coupled to the money transfer wall unit 100. As such, the money transfer wall unit 100 may comprise a writing instrument attachment 139. The writing instrument attachment 139 may be a chain, cord or the like connected to a writing instrument which the consumer may use to record data concerning the money transfer. In certain aspects the writing instrument attachment 139 may be a receptacle that contains one or more writing instruments.

In an embodiment of the present invention, the money transfer wall unit 100 may include a counter 145. Counter 145 may be attached to the bottom or sides of the money transfer wall unit 100 and may, in certain aspects, slide in and out from the money transfer wall unit 100 on runners, and/or be attached to the money transfer wall unit 100 by a hinge so that it may fold down from the money transfer wall unit 100 when in use and fold back up when not in use to provide that the counter 145 may not increase the operational size of the money transfer wall unit 100 when the counter 145 is not in use. In other embodiments the counter 145 may be attached to the sides of the money transfer wall unit 100 and may fold down and swing into a position in the front of the money transfer wall unit 100. The consumer may use the counter 145 as a staging surface on which to position paperwork concerning the money transfer and/or as a support on which to fill out paperwork and/or the like.

The money transfer wall unit 100 may also include a printer 142 that may print a record of the money transfer transaction. For example, the printer 142 may be used to print a receipt and/or a negotiable instrument, such as a check or money order. The printer 142 may be in communication with processor 127 and/or another processor associated with the money transfer wall unit 100. The printer 142 may also print data that the consumer may provide to an agent associated with the money transfer wall unit 100 to effectuate the money transfer transaction. In certain aspects, the printer 142 may produce marketing materials, such as discounts and special offers on goods or services of merchants associated with the financial services provider. These marketing materials may include barcodes etc. that the read/write port 137 may be capable of reading.

In an embodiment of the present invention, the money transfer wall unit 100 may include one or more biometric devices. A biometric device 147 may be a retina scanner, a face scanner, a finger print scanner, and/or the like. The biometric device 147 may be used to identify a consumer for security purposes. In some aspects, information taken from a storage medium, such as a card with a magnetic stripe, may be cross referenced with a biometric identification obtained from the biometric device 147 to ensure that the consumer using the storage medium is the rightful owner of the storage medium. In certain aspects, the biometric device 147 may be a still or video camera that is automatically operated when a transaction takes place to record the identity of the person conducting the money transfer transaction.

In an embodiment of the present invention, the money transfer wall unit 100 may be attached to a vertical surface via attachment points 150. In certain aspects, the money transfer wall unit 100 may be attached by the attachment points 150 to a wall. In different aspects, the money transfer wall unit 100 may be attached to a cabinet. The cabinet may be a cabinet containing other merchandise provided by an agent of the financial services provider associated with the money transfer wall unit 100. By attaching the money transfer wall unit 100 to a wall, a cabinet, or the like, the money transfer wall unit 100 may be positioned so as to attract consumer attention. Further, by attaching the money transfer wall unit 100 to a wall, the money transfer wall unit 100 may be positioned at a height convenient for the consumer and does not require floor space. The latter may be an important feature for an agent of the financial services provider who may not desire to provide dedicated counter space to a money transfer terminal. In different embodiments, including those depicted in FIGS. 2A-2D, the money transfer wall unit 100 may be attached to a vertical surface by different attachments, including attachments providing for the vertical movement of the money transfer wall unit 100.

Figure 2A:
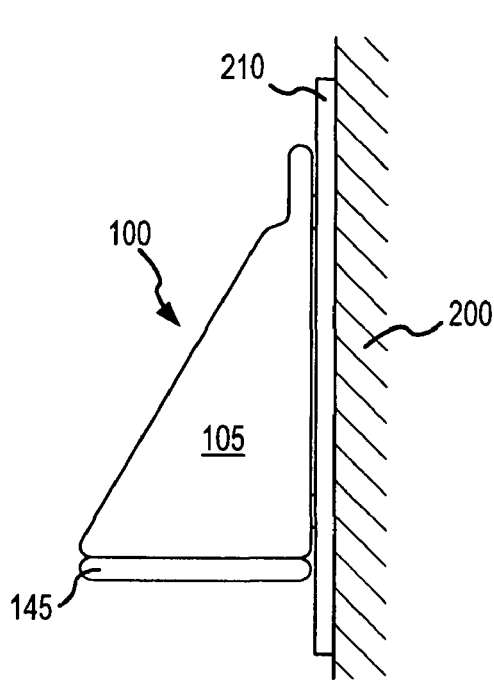
FIG. 2A is a right side view of a money transfer wall unit according to an embodiment of the present invention.

Turning now to FIGS. 2A-2D, mechanisms for attaching the money transfer wall unit 100 to a vertical surface are illustrated. As discussed above, the money transfer wall unit 100 may be attached to a vertical surface 200. The vertical surface 200 may be a wall, a support, a cabinet, or the like. In FIG. 2A the money transfer wall unit 100 may be attached to the vertical surface 200 by means of one or more tracks 210 that may provide for sliding the money transfer wall unit 100 through different vertical placements. The tracks 210 may contain a plurality of spaced holes into which one or more pins, pegs, posts or the like may be at least partially received. The height setting of the money transfer wall unit 100 may be adjusted by placing the pins in the desired holes in tracks 210. In one embodiment, a lever, tab, button or the like is coupled to one or more pins by way of a spring or other resilient member, or a rod or other generally stiff member. In this manner, pulling on the lever retracts the pins from the holes, to adjust the money transfer wall unit 100. One or more stops may be located in the tracks 210 to prevent the money transfer wall unit 100 falling to the floor and/or being damaged by dropping down the tracks 210. Retaining mechanisms may be used to retain a connection between the money transfer wall unit 100 and the tracks 210 to retain a connection between the money transfer wall unit 100 and the tracks 210 to prevent the money transfer wall unit 100 falling to the floor.

Figure 2B:
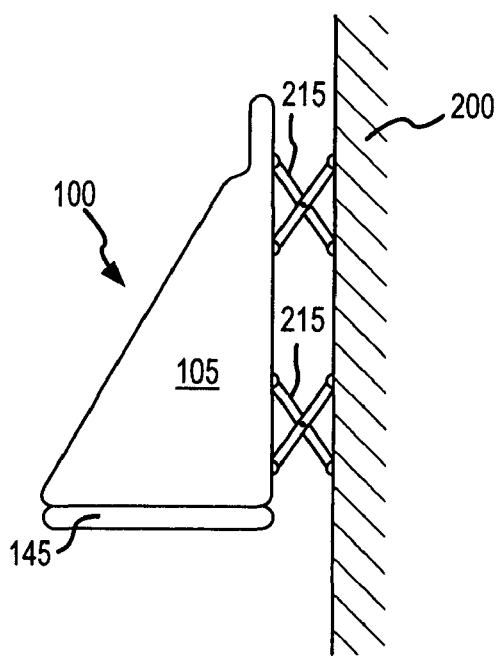
FIG. 2B is a right side view of a money transfer wall unit according to an alternative embodiment of the present invention.
Figure 2C:
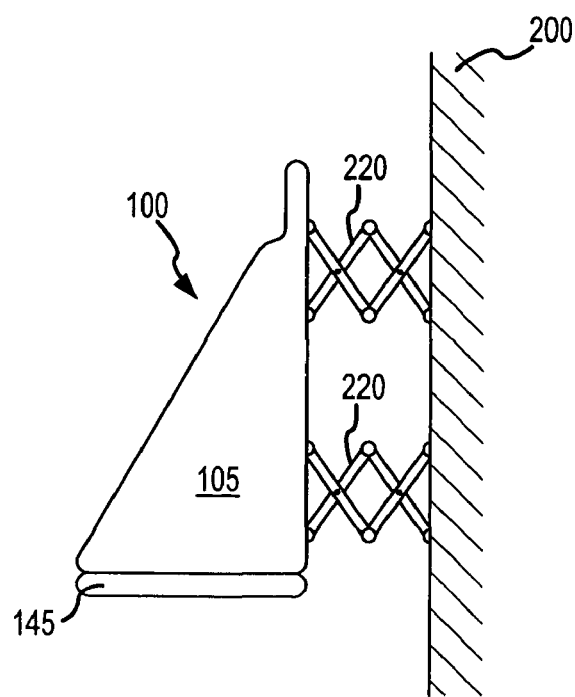
FIG. 2C is a right side view of a money transfer wall unit according to a further embodiment of the present invention.
Figure 2D:
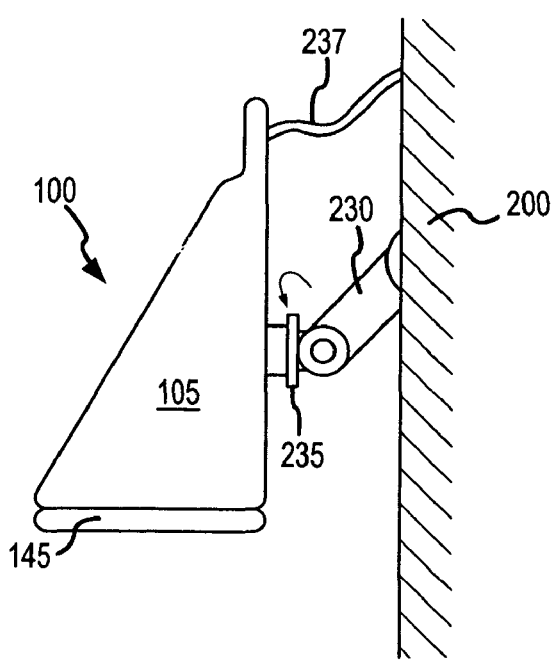
FIG. 2D is a right side view of a money transfer wall unit according to a still further embodiment of the present invention.

FIG. 2B illustrates an embodiment of the present invention in which the money transfer wall unit 100 is attached to the vertical surface 200 by two or more scissor hinges 210. The scissor hinges 210 may provide for moving the money transfer wall unit 100 vertically while it is secured to vertical surface 200. The scissor hinges 215 may have pneumatic connectors, friction washers, and/or the like, to ensure that the money transfer wall unit 100 stops and is functional in a position selected by the consumer. FIG. 2C illustrates an embodiment in which the money transfer wall unit 100 is attached to the vertical surface 200 by accordion hinges 220. Two or more of the accordion hinges 220 may be used to secure the money transfer wall unit 100 to the vertical surface 200. As with the scissor hinges 215, the accordion hinges 220 may include pneumatic connections, friction washers, counter force balancing and the like, to provide that the money transfer wall unit 100 maintains a position selected by the consumer. FIG. 2D illustrates the money transfer wall unit 100 attached to the vertical surface 200 by an adjustable arm 230. In different embodiments one or more adjustable arms 230 may be used to attach the money transfer wall unit 100 to the vertical surface 200. Means including pneumatic connections, friction washers, counter force balancing and the like, may be included in the adjustable arm 230 to provide that the money transfer wall unit 100 may be easily moved to different vertical positions and will remain in the selected vertical position. As persons of skill in the art will appreciate, combinations of the attachment mechanisms and other attachment mechanisms that are not illustrated may be used to provide that the money transfer wall unit 100 may be vertically mobile. Further, a swivel mechanism 235 may be incorporated with the adjustable arm 230 to provide for swiveling of the money transfer wall unit 100 to a position convenient for the consumer.

Wiring for the money transfer wall unit 100 may be incorporated into a harness 237 or the like to maintain an electrical and/or a network connection for the money transfer wall unit 100 as it is moved. In certain aspects, wireless operation may be provided for the money transfer wall unit 100. By providing for moveability of the money transfer wall unit 100, embodiments of the present invention provide a funds transfer terminal that is accessible to people of all statures and people in wheel chairs.

Figure 3:
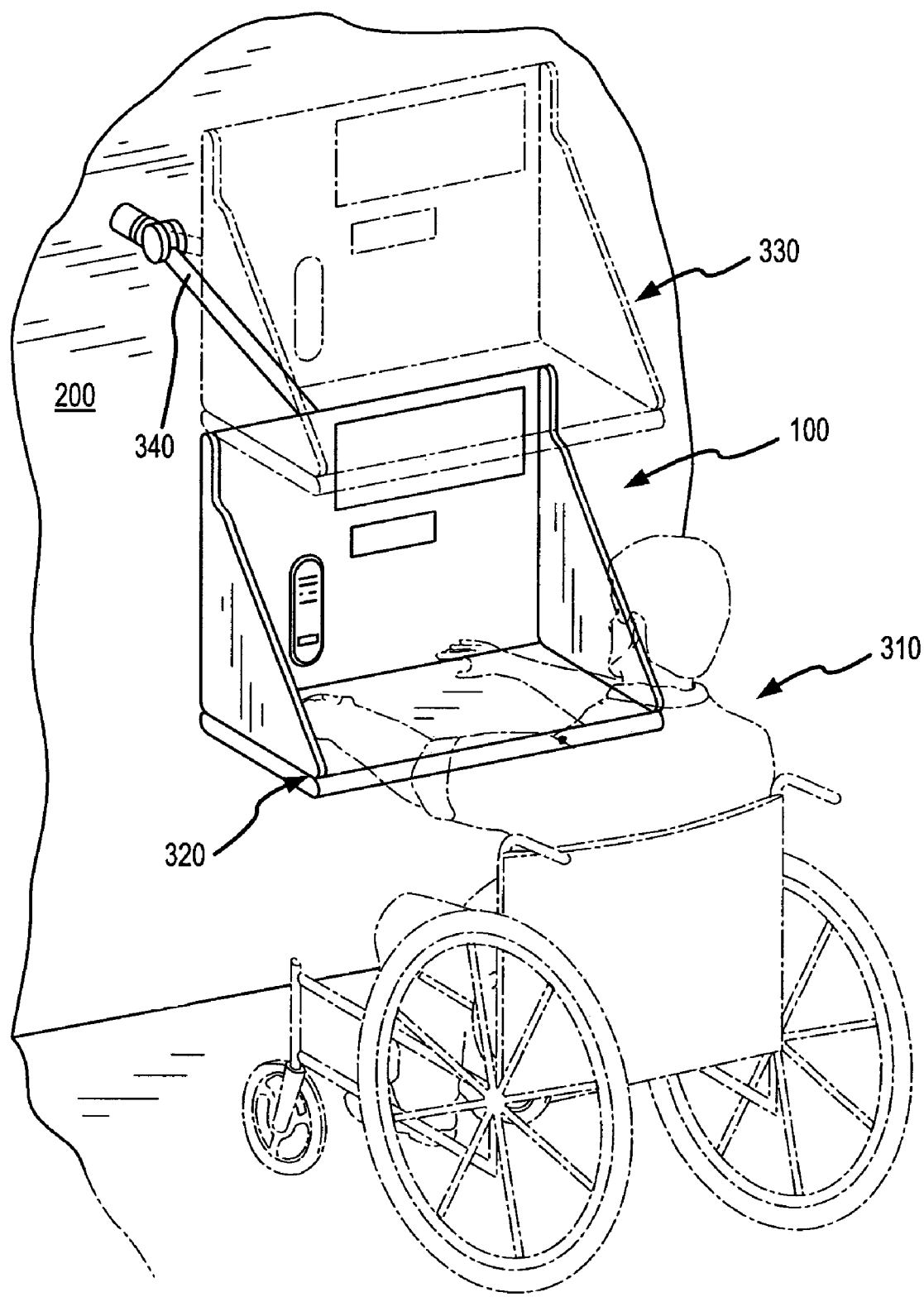
FIG. 3 illustrates a money transfer wall unit according to an embodiment of the present invention accessed by a person in a wheel chair.

FIG. 3 illustrates a person in a wheel chair 310 accessing the money transfer wall unit 100. As depicted, the money transfer wall unit is in vertical position 320 after the money transfer wall unit 100 has been lowered vertically from position 330. The same vertical positioning may be performed for people of smaller stature. By configuring the correct attachment of the attachment mechanism 340 to the vertical support 200, the attachment mechanism 340 is capable of positioning the money transfer wall unit 100 in position 320 where it is readily accessible to the person in the wheel chair 310. In certain aspects, a swivel mechanism is included in attachment mechanism 340 to provide that the person in the wheel chair 310 may swivel the money transfer wall unit 100 for convenience, including when the money transfer wall unit 100 is too close to the vertical support 200 for easy access by the person in the wheel chair 310.

While the principles of the disclosure have been described above in connection with specific apparatuses and methods, it is to be clearly understood that this description is made only by way of example and not as limitation on the scope of the invention.

What is claimed is:

1. A money transfer workstation, comprising:
a wall terminal configured to attach to a vertical support, wherein the wall terminal includes a display face:
a transaction interface connected to the terminal, wherein the transaction interface is configured to provide communication between the transaction interface and a transaction provider:
a consumer display provided on the display face, wherein:
the consumer display comprises an active display;
the consumer display is configured to display an instruction set; and
the instruction set comprises instructions for using the money transfer workstation to transact a cash money transfer to a person;
a storage medium coupled to the active display, wherein:
the storage medium is configured to store a plurality of different instruction sets suitable to be displayed to a consumer, instructing the consumer how to perform a plurality of different financial transactions: and
the active display is configured to receive one of the plurality of different instruction sets suitable to be displayed to the consumer from the storage medium and to display the received instruction set to the consumer, wherein the received instruction set comprises instructions instructing the consumer how to perform a cash money transfer: and
a computer-readable medium interface, wherein:
the computer-readable medium interface is configured to read machine accessible data identifying the consumer as a payor of a money transfer transaction.

2. The money transfer workstation as recited in claim 1, wherein the transaction interface comprises a telephone.

3. The money transfer workstation as recited in claim 1, wherein the transaction interface comprises a processor.

4. The money transfer workstation as recited in claim 3, wherein the processor communicates with the transaction provider via a computer network.

5. The money transfer workstation as recited in claim 1, wherein the active display is a liquid crystal display.

6. The money transfer workstation as recited in claim 1, wherein:
the storage medium stores each of the plurality of different instruction sets in a plurality of languages; and
the memory is configured to selectively provide each of the plurality of different instruction sets to the user in a user-selected language from the plurality of languages.

7. The money transfer workstation as recited in claim 1, wherein the active display is configured to display advertisements.

8. The money transfer workstation as recited in claim 1, wherein the vertical support is a one of a wall and a cabinet.

9. The money transfer workstation as recited in claim 1, further comprising a staging surface attached to the wall terminal and configured to provide a surface for staging the financial transaction.

10. The money transfer workstation as recited in claim 9, wherein the staging surface is flexibly attached to the wall terminal and is configured to transition to a one of a first location under the wall terminal and a second location to the side of the wall terminal when the wall terminal is not in use.

11. The money transfer workstation as recited in claim 1, further comprising at least one receptacle adapted to hold a paper version of the instruction set.

12. The money transfer workstation as recited in claim 1 wherein a. paper document contains spaces that a user may complete with data concerning the financial transaction.

13. The money transfer workstation as recited in claim 1, further comprising a biometric system connected to the wall terminal and configured to identify a user of the financial transaction workstation.

14. The money transfer workstation as recited in claim 1, wherein the machine accessible data is stored on a storage medium in the form of a barcode, a magnetic stripe or a MICR line.

15. The money transfer workstation as recited in claim 1, wherein the machine accessible data is stored on an RF chip associated with a storage medium.

16. The money transfer workstation as recited in claim 1, further comprising a printer connected to the wall terminal and configured to prim data concerning the financial transaction.

17. The money transfer workstation as recited in claim 1, further comprising a substantially horizontal staging surface coupled directly to the terminal.

18. The money transfer workstation as recited in claim 1, further comprising a biometric system connected to the terminal and configured:
to collect biometric identification information of a user of the financial transaction workstation; and
compare the collected biometric identification information to information stored on a storage medium.

19. The money transfer workstation of claim 1, further comprising a connector port, wherein the connector port is configured to provide communication between the transaction interface and a consumer's portable device.

20. The money transfer workstation of claim 1, further comprising an output device, wherein the output device writes details of a transaction to a machine accessible medium.

21. The money transfer workstation of claim 1, further comprising a dispenser, wherein the dispenser dispenses incentives containing machine accessible information.

22. The money transfer workstation of claim 21, wherein the incentives are coupons.

23. The money transfer workstation of claim 1, further comprising a reader, wherein the reader is configured to read incentives containing machine accessible information.

24. The money transfer workstation of claim 1, further comprising a reader, wherein the reader is configured to read payment instructions directing a payment to a particular party.

25. The money transfer workstation of claim 1, wherein the consumer display is further configured to receive and display a response from a customer service representative to a question posed by the consumer.

26. The workstation of claim 1, wherein the computer-readable medium interface is further configured to read machine-accessible data identifying a payee of the money transfer transaction.

27. A money transfer workstation for use by a user, comprising:
 a terminal with a display face:
 a transaction interlace connected to the terminal, wherein the transaction interface is configured to provide communication between the transaction interface and a transaction provider; and
 a consumer display provided on the display face, wherein:
  the consumer display comprises an active display;
  the consumer display is configured to display an instruction set; and
  the instruction set comprises instructions for using the money transfer workstation to transact a money transfer transaction;
 a storage medium coupled to the active display, wherein:
 the storage medium is configured to store computer-readable instructions for receiving a money transfer control number via the transaction interface from the transaction provider;
  the storage medium is configured to store computer-readable. instructions for providing the money transfer control number to the user:
  the storage medium is configured to store a plurality of different instruction sets suitable to be displayed to a consumer, instructing the consumer how to perform a plurality of different financial transactions; and
  the active display is configured to receive one of the plurality of different instruction sets suitable to be displayed to the consumer from the storage medium and to display the received instruction set to the consumer: and
 a computer-readable medium interface, wherein:
  the computer-readable medium interface is configured to read machine-accessible data identifying a payee of a money transfer transaction.

28. The money transfer workstation of claim 27, further comprising an attachment mechanism connected to the terminal and configured to attach the terminal to a vertical support, wherein the terminal and the attachment mechanism are configured to provide that the display face is visible and accessible when the terminal is attached to the vertical support.

29. The money transfer workstation as recited in claim 28, wherein the attachment mechanism is a one of at least one sliding rail with stopping points, at least one scissor hinge, at least one concertina hinge, and at least one move and position arm.

30. The money transfer workstation as recited in claim 28, wherein the terminal and the attachment mechanism are configured to provide that the display lace is accessible. from a wheelchair when the terminal is attached by the attachment mechanism to the vertical support.

31. The money transfer workstation as recited in claim 28, wherein the transaction interface comprises a telephone.

32. The money transfer workstation as recited in claim 28, wherein the transaction interface comprises a processor connected to the transaction provider by a computer network.

33. The money transfer workstation as recited in claim 28, wherein the active display is configured to display advertisements.

34. The money transfer workstation as recited in claim 28, further comprising a substantially horizontal staging surface coupled directly to the terminal.

35. The money transfer as recited in claim 28, further comprising at least one receptacle adapted to hold a paper version of the instruction set.

36. The money transfer workstation as recited in claim 28, further comprising a biometric system connected to the terminal and configured to identify a user of the vertically moveable financial transaction workstation.

37. The money transfer workstation as recited in claim 28, further comprising a printer connected to the terminal and configured to print data concerning, the financial transaction.

38. The money transfer workstation as recited in claim 28, wherein the attachment mechanism comprises at least one scissor hinge or at least one concertina hinge.

39. A method for providing a cash money transfer terminal for use by a first user, the method comprising,:
 providing a unit incorporating a user interface, a storage medium, a computer-readable medium interface, and a user display, wherein:
  the user interface is configured to provide communication between the unit and a transaction provider;
  the storage medium is configured to store a plurality of different instruction sets suitable to be displayed to a user, instructing the user how to perform a plurality of different financial transactions, the storage medium is configured to store computer-readable instructions for receiving a money transfer control number via the transaction interface from the transaction provider;
  the storage medium is configured to store computer-readable instructions for providing the money transfer control number to the first user;
  the user display is configured to display an instruction set suitable to be displayed to the first user comprising instructions for using the money transfer terminal to transact a cash money transfer with the transaction provider between the first user and a second user;
  the user display comprises an active display configured to receive one of the plurality of different instruction sets suitable to be displayed to the user from the storage medium and to display the received instruction set to the user; and
  the computer-readable medium interface is configured to receive loyalty information on the first user from a computer-readable storage medium.

40. The method for providing the money transfer terminal as recited in claim 39, further comprising attaching the unit to a vertical support with a moveable attachment mechanism, wherein the moveable attachment mechanism is configured to provide for vertical movement of the unit.

41. The method for providing the cash money transfer terminal as recited in claim 40, wherein the moveable attachment mechanism is configured to provide for the vertical movement of the unit to at least a vertical height where the unit is accessible to a person in a wheelchair.

* * * * *

UNITED STATES PATENT AND TRADEMARK OFFICE
CERTIFICATE OF CORRECTION

PATENT NO. : 7,766,224 B2  Page 1 of 1
APPLICATION NO. : 11/089052
DATED : August 3, 2010
INVENTOR(S) : Paul J. Vogt It is certified that error appears in the above-identified patent and that said Letters Patent is hereby corrected as shown below:

Column 8, line 5, delete "finds" and insert --funds--

Column 12, claim 16, line 39, delete "prim" and insert --print--

Column 13, claim 27, line 17, delete "interlace" and insert --interface--

Column 13, claim 30, line 62, delete "lace" and insert --face--

Signed and Sealed this

Second Day of November, 2010

David J. Kappos
*Director of the United States Patent and Trademark Office*

(12) EX PARTE REEXAMINATION CERTIFICATE (10075th)
United States Patent
Vogt

(10) Number: US 7,766,224 C1
(45) Certificate Issued: Mar. 18, 2014

(54) MONEY TRANSFER WALL UNIT

(75) Inventor: Paul J. Vogt, Highlands Ranch, CO (US)

(73) Assignee: The Western Union Company, Englewood, CO (US)

Reexamination Request:
No. 90/012,392, Jul. 18, 2012

Reexamination Certificate for:
Patent No.: 7,766,224
Issued: Aug. 3, 2010
Appl. No.: 11/089,052
Filed: Mar. 23, 2005

Certificate of Correction issued Nov. 2, 2010

(51) Int. Cl.
*G06K 5/00* (2006.01)
*G07F 19/00* (2006.01)

(52) U.S. Cl.
USPC .......................................... 235/380; 235/379

(58) Field of Classification Search
None
See application file for complete search history.

(56) References Cited

To view the complete listing of prior art documents cited during the proceeding for Reexamination Control Number 90/012,392, please refer to the USPTO's public Patent Application Information Retrieval (PAIR) system under the Display References tab.

*Primary Examiner* — Joseph R. Pokrzywa

(57) ABSTRACT

A financial transaction wall unit workstation is provided which may be configured to attach to a vertical support and may comprise include at least one display face, a transaction interface for communicating between the financial transaction wall unit workstation and a financial services provider, and a consumer display with instructions for using the financial transaction wall unit workstation to transact a financial transaction with the financial services provider. In certain aspects, the financial transaction wall unit workstation may be attached to a vertical support using a flexible attachment mechanism. Attachment of the financial transaction wall unit workstation to a vertical support using flexible attachment mechanisms may provide for vertical movement of the financial transaction wall unit workstation and may allow for accessibility of the financial transaction wall unit workstation by people of different statures and people in wheel chairs.

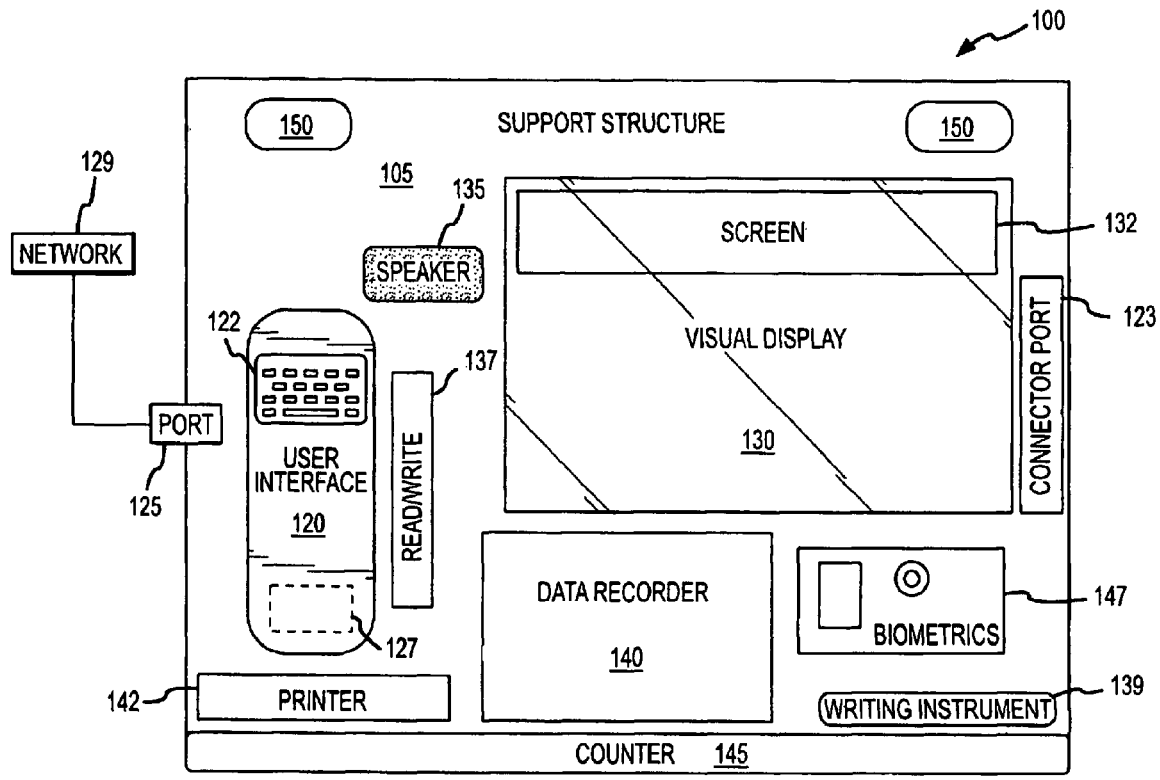

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 28 is cancelled.

Claims 1, 27 and 29-39 are determined to be patentable as amended.

Claims 2-26, 40 and 41, dependent on an amended claim, are determined to be patentable.

New claims 42-91 are added and determined to be patentable.

1. A money transfer workstation, comprising:
  a wall terminal configured to attach to a vertical support, wherein the wall terminal includes a display face;
  *an attachment mechanism connected to the wall terminal and configured to attach the wall terminal to the vertical support, wherein the wall terminal and the attachment mechanism are configured to provide that the display face is visible and accessible when the wall terminal is attached to the vertical support;*
  a transaction interface connected to the wall terminal, wherein the transaction interface is configured to provide communication between the transaction interface and a transaction provider;
  a consumer display provided on the display face, wherein:
    the consumer display comprises an active display;
    the consumer display is configured to display an instruction set; and
    the instruction set comprises instructions for using the money transfer workstation to transact a cash money transfer to a person;
  a storage medium coupled to the active display, wherein:
    the storage medium is configured to store a plurality of different instruction sets suitable to be displayed to a consumer, instructing the consumer how to perform a plurality of different financial transactions; and
    the active display is configured to receive one of the plurality of different instruction sets suitable to be displayed to the consumer from the storage medium and to display the received instruction set to the consumer, wherein the received instruction set comprises instructions instructing the consumer how to perform [a] *the* cash money transfer; and
  a computer-readable medium interface, wherein:
    the computer-readable medium interface is configured to read machine accessible data identifying the consumer as a payor of a money transfer transaction*; wherein:*
    *the money transfer workstation is configured to provide the consumer with a transaction identifier received from a host computer system and the transaction identifier is subsequently provided to an agent who enters the transaction identifier into a computer to effectuate the cash money transfer.*

27. A money transfer workstation for use by a user, comprising:
  a terminal with a display face;
  a transaction interface connected to the terminal, wherein the transaction interface is configured to provide communication between the transaction interface and a transaction provider; [and]
  *an attachment mechanism connected to the terminal and configured to attach the terminal to a vertical support, wherein the terminal and the attachment mechanism are configured to provide that the display face is visible and accessible when the terminal is attached to the vertical support; and*
  a consumer display provided on the display face, wherein:
    the consumer display comprises an active display;
    the consumer display is configured to display an instruction set; and
    the instruction set comprises instructions for using the money transfer workstation to transact a money transfer transaction;
  a storage medium coupled to the active display, wherein:
    the storage medium is configured to store computer-readable instructions for receiving a money transfer control number via the transaction interface from the transaction provider;
    the storage medium is configured to store computer-readable instructions for providing the money transfer control number to the user;
    the storage medium is configured to store a plurality of different instruction sets suitable to be displayed to a consumer, instructing the consumer how to perform a plurality of different financial transactions; and
    the active display is configured to receive one of the plurality of different instruction sets suitable to be displayed to the consumer from the storage medium and to display the received instruction set to the consumer; and
  a computer-readable medium interface, wherein:
    the computer-readable medium interface is configured to*:*
      read machine-accessible data identifying a payee of a money transfer transaction*; wherein:*
      *the money transfer workstation is configured to provide the consumer with a transaction identifier received from a host computer system, and*
      *the transaction identifier is subsequently provided to an agent who enters the transaction identifier into a computer to effectuate the cash money transfer.*

29. The money transfer workstation as recited in claim [28] *27*, wherein the attachment mechanism is a one of at least one sliding rail with stopping points, at least one scissor hinge, at least one concertina hinge, and at least one move and position arm.

30. The money transfer workstation as recited in claim [28] *27*, wherein the terminal and the attachment mechanism are configured to provide that the display face is accessible from a wheelchair when the terminal is attached by the attachment mechanism to the vertical support.

31. The money transfer workstation as recited in claim [28] *27*, wherein the transaction interface comprises a telephone.

32. The money transfer workstation as recited in claim [28] *27*, wherein the transaction interface comprises a processor connected to the transaction provider by a computer network.

33. The money transfer workstation as recited in claim [28] 27, wherein the active display is configured to display advertisements based on a type of transaction being performed by the consumer.

34. The money transfer workstation as recited in claim [28] 27, further comprising a substantially horizontal staging surface coupled directly to the terminal.

35. The money transfer as recited in claim [28] 27, further comprising at least one receptacle adapted to hold a paper version of the instruction set.

36. The money transfer workstation as recited in claim [28] 27, further comprising a biometric system connected to the terminal and configured to identify a user of the vertically moveable financial transaction workstation.

37. The money transfer workstation as recited in claim [28] 27, further comprising a printer connected to the terminal and configured to print data concerning the financial transaction.

38. The money transfer workstation as recited in claim [28] 27, wherein the attachment mechanism comprises at least one scissor hinge or at least one concertina hinge.

39. A method for providing a cash money transfer terminal for use by a first user, the method comprising:
    providing, *for use by the first user,* a unit incorporating a user interface, a storage medium, a computer-readable medium interface, *a data recorder,* and a user display, such that *a financial transaction form is filled in by the first user while the first user is interfacing with the cash money transfer terminal,* wherein:
    the data recorder comprises a plurality of financial transaction forms for performing money transfer transactions;
    the financial transaction form of the plurality of financial transaction forms comprising spaces to be filled in by the first user while using the unit to conduct the money transfer transaction;
    the user interface is configured to provide communication between the unit and a transaction provider;
    the storage medium is configured to store a plurality of different instruction sets suitable to be displayed to [a] *the first* user, instructing the *first* user how to perform a plurality of different financial transactions, the storage medium is configured to store computer-readable instructions for receiving a money transfer control number via [the] *a* transaction interface *of the unit* from the transaction provider;
    the storage medium is configured to store computer-readable instructions for providing the money transfer control number to the first user;
    the user display is configured to display an instruction set suitable to be displayed to the first user comprising instructions for using the money transfer terminal to transact a cash money transfer with the transaction provider between the first user and a second user;
    the user display comprises an active display configured to receive one of the plurality of different instruction sets suitable to be displayed to the first user from the storage medium and to display the received instruction set to the first user; [and]
    the computer-readable medium interface is configured to receive loyalty information on the first user from a computer-readable storage medium*;*
    *receiving, by an agent of the transaction provider, the financial transaction form to conduct the cash money transfer transaction; and*
    *entering, by the agent, information from the financial transaction form to a computer in communication with the transaction provider.*

42. The money transfer workstation as recited in claim 1, wherein the attachment mechanism permits the wall terminal to be vertically mobile.

43. The money transfer workstation as recited in claim 42, wherein the attachment mechanism comprises one or more tracks.

44. The money transfer workstation as recited in claim 43, wherein:
    each track of the one or more tracks comprises a plurality of spaced holes configured to receive one or more pins; and
    a height of the money transfer workstation is adjusted by placing the one or more pins in desired holes of the plurality of spaced holes.

45. The money transfer workstation as recited in claim 44, further comprising a lever coupled with the one or more pins, wherein
    the lever is configured such that pulling the lever retracts the one or more pins from the desired holes of the plurality of spaced holes.

46. The money transfer workstation as recited in claim 44, further comprising a button coupled with the one or more pins, wherein
    the button is configured to cause the one or more pins to retract from the desired holes of the plurality of spaced holes.

47. The money transfer workstation as recited in claim 43, wherein the one or more tracks comprise one or more stops configured to prevent the money transfer workstation from falling.

48. The money transfer workstation as recited in claim 1, wherein the money transfer workstation is configured to perform at least two types of transactions selected from the group consisting of:
    obtaining a first gift card,
    remotely sending a second gift card,
    applying for a loan,
    applying for a credit card,
    paying a bill,
    establishing wireless phone service,
    adding minutes for use by a wireless phone to a wireless phone account,
    adding additional text messaging to a first portable device,
    entering a sweepstakes, and
    downloading services to a second portable device.

49. The money transfer workstation as recited in claim 1, further comprising a user interface configured to receive a location identifier from the consumer, wherein the location identifier indicates the money transfer workstation.

50. The money transfer workstation as recited in claim 1, wherein the computer-readable medium interface is further configured to read machine accessible data necessary to conduct the cash money transfer.

51. The money transfer workstation as recited in claim 50, wherein the machine accessible data is stored on a computer-readable card.

52. The money transfer workstation as recited in claim 51, wherein the money transfer workstation is configured to provide the data necessary to conduct the cash money transfer from the computer-readable card to a customer service representative.

53. The money transfer workstation for use by the user of claim 52, wherein the computer-readable card is further configured to function as a loyalty card that allows the transaction provider to track transactions of the customer and provide a directed incentive.

54. The money transfer workstation as recited in claim 1, wherein the computer-readable medium interface is configured to write details of the cash money transfer to a computer-readable card.

55. The money transfer workstation as recited in claim 54, wherein the computer-readable card is accessed by the agent for finalizing the cash money transfer.

56. The money transfer workstation for use by the user of claim 27, wherein the money transfer workstation further comprises a USB connector port, wherein the USB connector port is configured to provide communication between the transaction interface and a consumer's portable device.

57. The method for providing the money transfer terminal as recited in claim 39, further comprising:
  collecting, by the agent, a monetary amount of the cash money transfer from the consumer.

58. A money transfer workstation, comprising:
  a wall terminal configured to attach to a vertical support via an attachment mechanism, wherein the wall terminal includes a display face and the vertical support is a wall;
  the attachment mechanism connected to the wall terminal, wherein:
    the attachment mechanism is configured to attach the terminal to the vertical support, and
    the terminal and the attachment mechanism are configured to provide that the display face is visible when the terminal is attached with the vertical support;
  a transaction interface connected to the wall terminal, wherein the transaction interface is configured to provide communication between the transaction interface and a transaction provider;
  a consumer display provided on the display face, wherein:
    the consumer display comprises an active display;
    the consumer display is configured to display an instruction set; and
    the instruction set comprises instructions for using the money transfer workstation to transact a cash money transfer to a person;
  a storage medium coupled to the active display, wherein:
    the storage medium is configured to store a plurality of different instruction sets suitable to be displayed to a consumer, instructing the consumer how to perform a plurality of different financial transactions; and
    the active display is configured to receive one of the plurality of different instruction sets suitable to be displayed to the consumer from the storage medium and to display the received instruction set to the consumer, wherein the received instruction set comprises instructions instructing the consumer how to perform the cash money transfer to the person from the consumer; and
  a computer-readable medium interface, wherein:
    the computer-readable medium interface is configured to:
    read machine accessible data identifying the consumer as a payor of a money transfer transaction; and
    write machine accessible data comprising details of the cash money transfer for use by an agent to finalize the money transfer transaction.

59. The money transfer workstation as recited in claim 58, wherein:
  the storage medium stores each of the plurality of different instruction sets in a plurality of languages; and
  the memory is configured to selectively provide each of the plurality of different instruction sets to the user in a user-selected language from the plurality of languages.

60. The money transfer workstation as recited in claim 58, wherein the active display is configured to display advertisements directed to the consumer.

61. The money transfer workstation as recited in claim 58, further comprising at least one receptacle adapted to hold a paper version of the instruction set.

62. The money transfer workstation as recited in claim 58, further comprising a biometric system connected to the wall terminal and configured to identify a user of the financial transaction workstation.

63. The money transfer workstation as recited in claim 58, further comprising a substantially horizontal staging surface coupled to the terminal.

64. The money transfer workstation as recited in claim 58, wherein the money transfer workstation is configured to allow the consumer to remotely send a gift card.

65. The money transfer workstation as recited in claim 58, wherein the money transfer workstation is configured to allow the consumer to establish wireless phone service.

66. The money transfer workstation as recited in claim 58, wherein the money transfer workstation is configured to allow the consumer to apply for a loan.

67. The money transfer workstation as recited in claim 58, wherein the money transfer workstation is configured to allow the consumer to pay a bill.

68. The money transfer workstation as recited in claim 58, further comprising a connector port configured to permit the consumer to download services from the money transfer workstation via WiFi.

69. The money transfer workstation as recited in claim 68, wherein the services comprise video games.

70. The money transfer workstation as recited in claim 68, wherein the services comprise ringtones.

71. The money transfer workstation as recited in claim 58, further comprising a user interface configured to receive a location identifier from the consumer, wherein the location identifier indicates the money transfer workstation.

72. The money transfer workstation as recited in claim 71, wherein a discount is provided to the consumer for providing the location identifier.

73. The money transfer workstation as recited in claim 58, wherein the active display is configured to display advertisements that are coordinated to the consumer based on a stored profile for the consumer.

74. The money transfer workstation as recited in claim 58, wherein the active display is configured to display advertisements that are coordinated to the consumer based on a type of transaction being performed by the consumer.

75. A money transfer workstation, comprising:
  a wall terminal configured to attach to a vertical support, wherein the wall terminal includes a display face;
  a transaction interface connected to the wall terminal, wherein the transaction interface is configured to provide communication between the transaction interface and a transaction provider;
  a consumer display provided on the display face, wherein:
    the consumer display comprises an active display;
    the consumer display is configured to display an instruction set; and
    the instruction set comprises instructions for using the money transfer workstation to transact a cash money transfer to a person;
  a storage medium coupled to the active display, wherein:
    the storage medium is configured to store a plurality of different instruction sets suitable to be displayed to a consumer, instructing the consumer how to perform a plurality of different financial transactions; and the active display is configured to receive one of the plurality of different instruction sets suitable to be displayed to the consumer from the storage medium and to display the received instruction set to the consumer, wherein the received instruction set comprises instructions instructing the consumer how to perform the cash money transfer to the person from the consumer;

a computer-readable medium interface, wherein:
the computer-readable medium interface is configured to read machine accessible data identifying the consumer as a payor of a money transfer transaction; and a data recorder that comprises a plurality of financial transaction forms for performing money transfer transactions, wherein:
a financial transaction form of the plurality of financial transaction forms comprising spaces to be filled in by the consumer while using the money transfer workstation to conduct the money transfer transaction;
each financial transaction form of the plurality of financial transaction forms is on paper; and
the financial transaction form, comprising a transaction identifier, is provided to an agent of the transaction provider to conduct the money transfer transaction.

76. The money transfer workstation of claim 75, wherein the financial transaction form presented to the agent indicates an amount of money to be sent to the person, sender information about the consumer, and recipient information about the person.

77. The money transfer workstation of claim 76, wherein information from the financial transaction form is entered by the agent to a computer in communication with the transaction provider.

78. The money transfer workstation of claim 76, wherein the agent reads information from the financial transaction form to a representative of the transaction provider to perform the cash money transfer.

79. The money transfer workstation of claim 77, wherein the agent collects the amount of the cash money transfer from the consumer.

80. The money transfer workstation of claim 75 further comprising a staging surface attached to the wall terminal and configured to provide a surface for the consumer to fill in the financial transaction form.

81. The money transfer workstation of claim 80 wherein the staging surface slides in and out from the money transfer workstation on runners.

82. The money transfer workstation of claim 80 wherein the staging surface is attached to the money transfer workstation via a hinge that permits the staging surface to fold down for use.

83. The money transfer workstation of claim 75 further comprising an attachment mechanism connected to the terminal and configured to attach the terminal to a vertical support, wherein the terminal and the attachment mechanism are configured to provide that the display face is visible and accessible when the terminal is attached to the vertical support.

84. The money transfer workstation of claim 75, wherein the attachment mechanism comprises two or more accordion hinges.

85. The money transfer workstation of claim 75, wherein the attachment mechanism comprises an adjustable arm.

86. The money transfer workstation of claim 85, wherein the adjustable arm further comprises a swivel mechanism.

87. A method for providing a cash money transfer terminal for use by a first user, the method comprising:
providing a unit incorporating a user interface, a storage medium, a computer-readable medium interface, and a user display, wherein:
the user interface is configured to provide communication between the unit and a transaction provider;
the storage medium is configured to store a plurality of different instruction sets suitable to be displayed to the first user, instructing the first user how to perform a plurality of different financial transactions, the storage medium is configured to store computer-readable instructions for receiving a money transfer control number via a transaction interface of the unit from the transaction provider;
the storage medium is configured to store computer-readable instructions for providing the money transfer control number to the first user;
the user display is configured to display an instruction set suitable to be displayed to the first user comprising instructions for using the money transfer terminal to transact a cash money transfer with the transaction provider between the first user and a second user;
the user display comprises an active display configured to receive one of the plurality of different instruction sets suitable to be displayed to the first user from the storage medium and to display the received instruction set to the first user; and
the computer-readable medium interface is configured to receive loyalty information on the first user from a computer-readable storage medium;
writing, by the computer-readable medium interface, details of the cash money transfer with the transaction provider between the first user and the second user to a computer-readable card, wherein the details are used by an agent to finalize the cash money transfer; and
receiving, by the agent from the first user, the computer-readable card; and
accessing, by the agent, the details of the cash money transfer from the computer-readable card to finalize the cash money transfer.

88. The method for providing the cash money transfer terminal for use by the first user of claim 87, wherein writing, by the computer-readable medium interface, details of the cash money transfer comprises a receipt for the cash money transfer.

89. The method for providing the cash money transfer terminal for use by the first user of claim 87, wherein writing, by the computer-readable medium interface, details of the cash money transfer comprises writing instructions for finalizing the cash money transfer to the computer-readable card for the agent.

90. The method for providing the cash money transfer terminal for use by the first user of claim 87, further comprising:
collecting, by the agent, an amount of cash corresponding to the cash money transfer.

91. A money transfer workstation, comprising:
a wall terminal configured to attach to a vertical support, wherein the wall terminal includes a display face;
a transaction interface connected to the wall terminal, wherein the transaction interface is configured to provide communication between the transaction interface and a transaction provider;
a consumer display provided on the display face, wherein:
the consumer display comprises an active display;
the consumer display is configured to display an instruction set; and the instruction set comprises instructions for using the money transfer workstation to transact a cash money transfer to a person;

a storage medium coupled to the active display, wherein:

the storage medium is configured to store a plurality of different instruction sets suitable to be displayed to a consumer, instructing the consumer how to perform a plurality of different financial transactions; and the active display is configured to receive one of the plurality of different instruction sets suitable to be displayed to the consumer from the storage medium and to display the received instruction set to the consumer, wherein the received instruction set comprises instructions instructing the consumer how to perform the cash money transfer; and a computer-readable medium interface, wherein:

the computer-readable medium interface is configured to read machine accessible data identifying the consumer as a payor of a money transfer transaction;

a user interface configured to receive data about the cash money transfer; and a processor configured to transfer the data about the cash money transfer to a host computer, wherein the money transfer workstation is configured to provide the consumer with a transaction identifier received from the host computer and the transaction identifier is subsequently provided to an agent who enters the transaction identifier into a computer to effectuate the cash money transfer.

\* \* \* \* \*